US010167973B2

(12) United States Patent
Yoo (10) Patent No.: US 10,167,973 B2
(45) Date of Patent: Jan. 1, 2019

(54) MULTI-STAGE POPPET VALVE (71) Applicant: KOREA AEROSPACE RESEARCH INSTITUTE, Daejeon (KR)

(72) Inventor: Jaehan Yoo, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/354,437

(22) Filed: Nov. 17, 2016

(65) Prior Publication Data

US 2017/0159838 A1    Jun. 8, 2017

(30) Foreign Application Priority Data

Dec. 2, 2015 (KR) .................. 10-2015-0170796

(51) Int. Cl.
*F16K 27/02* (2006.01)
*F16K 15/02* (2006.01)
*F16K 31/12* (2006.01)
*F16K 39/02* (2006.01)

(52) U.S. Cl.
CPC ........ *F16K 27/0209* (2013.01); *F16K 15/021* (2013.01); *F16K 31/12* (2013.01); *F16K 39/024* (2013.01)

(58) Field of Classification Search
CPC ...... F16K 39/024; F16K 15/021; F16K 31/12; F16K 39/0209
USPC ........................................... 137/512.2
See application file for complete search history.

(56) References Cited

U.S. PATENT DOCUMENTS

| 842,160 | A | * | 1/1907 | Aikman | ............... G01L 19/12 |
| | | | | | 116/70 |
| 2,716,997 | A | * | 9/1955 | Crookston | ............ F16D 25/14 |
| | | | | | 137/102 |
| 4,041,979 | A | | 8/1977 | Grotloh | |
| 5,095,939 | A | * | 3/1992 | Alderfer | ................. F16K 17/04 |
| | | | | | 137/512.1 |
| 5,176,171 | A | * | 1/1993 | Andersson | ............ F16K 15/063 |
| | | | | | 137/512.1 |
| 5,848,608 | A | | 12/1998 | Ishigaki | |

(Continued)

FOREIGN PATENT DOCUMENTS

| DE | 1014810 | 8/1957 |
| DE | 10 2009 046 577 | 5/2011 |
| FR | 2 615 585 | 11/1988 |

(Continued)

*Primary Examiner* — P. Macade Hyllis Nichols
(74) *Attorney, Agent, or Firm* — Hauptman Ham, LLP (57) ABSTRACT Provided is a multi-stage poppet valve including: a flow pipe in which a channel through which a fluid flows is formed; a fixing part extended inwardly from an inner peripheral surface of the channel of the flow pipe, and having a first channel formed therein, the first channel being hollowed in a vertical direction and having the fluid flowing therethrough; a main valve part disposed on the fixing part, having a second channel formed at the center of an inner portion thereof, and vertically moved by force acting in the vertical direction to open and close the first channel, the second channel having the fluid flowing therethrough; and an auxiliary valve part vertically moved in the second channel by force acting in the vertical direction to open and close the second channel, thereby controlling a flow rate of the fluid passing through the second channel.

5 Claims, 7 Drawing Sheets

(56) References Cited

U.S. PATENT DOCUMENTS

2010/0252770 A1    10/2010  Lin et al.

FOREIGN PATENT DOCUMENTS

| GB | 2 429 262 | 2/2007 |
|----|-----------|--------|
| JP | 50-22723 | 3/1975 |
| JP | H102425 | 1/1998 |
| KR | 100221563 | 10/1999 |
| NL | 7 510 789 | 1/1977 |

* cited by examiner

MULTI-STAGE POPPET VALVE

CROSS-REFERENCE TO RELATED APPLICATIONS

This application claims priority under 35 U.S.C. § 119 to Korean Patent Application No. 10-2015-070796, filed on Dec. 2, 2015, in the Korean Intellectual Property Office, the disclosure of which is incorporated herein by reference in its entirety.

TECHNICAL FIELD

The following disclosure relates to a multi-stage poppet valve. More particularly, the following disclosure relates to a multi-stage poppet valve capable of stepwise controlling an opening level, being moved with small force, and having high reliability, in opening or closing a channel.

BACKGROUND

In accordance with the development and the advance of technology and industry, kinds of fluids that should be controlled tend to be diversified. In addition, it has been required to control a fluid having high energy such as a high temperature, a high pressure, or the like, at a high level in terms of safety of industry, and importance of a value, which is a requisite component in a machine or a system having a driving device capable of opening and closing a channel in order to control the fluid, has increased day-by-day.

Figure 1:
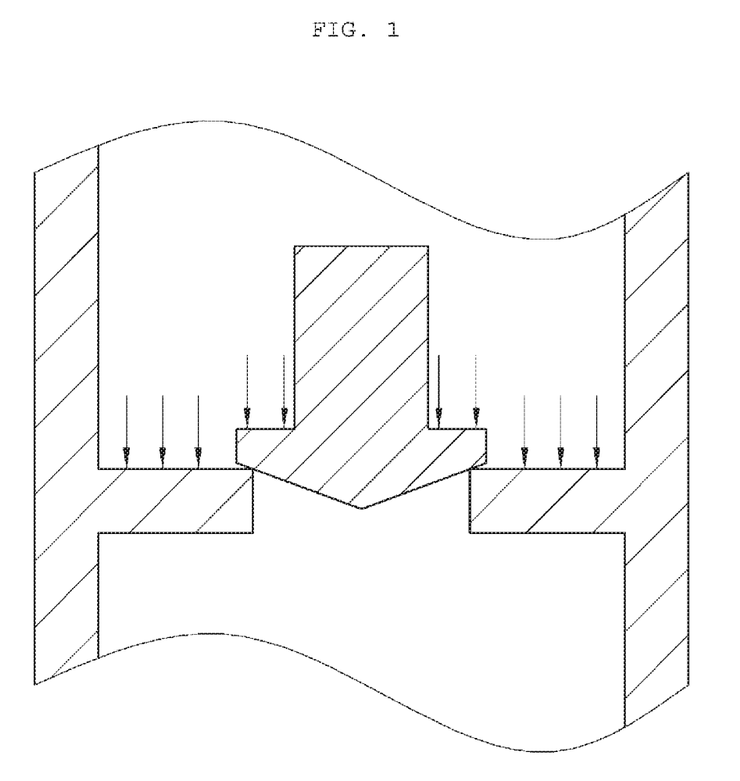
FIG. 1 is a schematic view illustrating a poppet valve according to the related art.

Therefore, a structure of the valve itself has been gradually developed, and the valve has been classified into various valves depending on a manipulation scheme, a structure, and a sealing scheme thereof. Among valves classified depending on the structure, there is a poppet valve. FIG. 1 is view illustrating a poppet valve according to the related art. As illustrated in FIG. 1, the poppet valve is the most basic structure, and is generally used in a pressure control valve, a flow rate control valve, a direction control valve. In the poppet valve, when a user does not apply force to a valve body having a mushroom shape, the valve body closely adheres to a valve sheet to close a channel, when the user applies force to the valve body to change a position of the valve body, the channel is opened to control a flow rate of a fluid, and when the user does not apply force to the valve body, the valve body again contacts the valve sheet by pressure of the fluid to close the channel.

The poppet valve according to the related art described above may control the flow rate of the fluid by a simple configuration. However, since a magnitude of force required for moving the valve body is increased in proportion to pressure of the fluid, in the case in which the pressure of the fluid is strong, it is difficult for the user to easily use the poppet valve, and durability of a configuration of the poppet valve should be improved in proportion to the magnitude of the force. The poppet valve according to the related art described above has been disclosed in Korean Patent Laid-Open Publication No. 10-1997-0062441 (entitled "Poppet Valve" and published on Sep. 12, 1997).

RELATED ART DOCUMENT

Patent Document (Patent Document 1) Korean Patent Laid-Open Publication No. 10-1997-0062441 (entitled "Poppet Valve" and published on Sep. 12, 1997)

SUMMARY

An embodiment of the present invention is directed to providing a multi-stage poppet valve capable of stepwise controlling opening of a channel, opening the channel with small force, and having improved reliability.

In one general aspect, a multi-stage poppet valve includes: a flow pipe 10 in which a channel through which a fluid flows is formed; a fixing part extended inwardly from an inner peripheral surface of the channel of the flow pipe 10, and having a first channel 110 formed therein, the first channel 110 being hollowed in a vertical direction and having the fluid flowing therethrough; a main valve part 200 disposed on the fixing part 100, having a second channel 210 formed at the center of an inner portion thereof, and vertically moved by force acting in the vertical direction to open and close the first channel 110, the second channel 210 having the fluid flowing therethrough; and an auxiliary valve part 300 vertically moved in the second channel by force acting in the vertical direction to open and close the second channel 210, thereby controlling a flow rate of the fluid passing through the second channel 210, wherein the first channel 110 and the second channel 210 are selectively opened and closed depending on magnitudes of force acting on the main valve part 200 and the auxiliary valve part 300.

The main valve part 200 may include a first protrusion 220 protruding from an upper inner surface of the second channel 210 toward the center of the flow pipe 10, a second protrusion 230 protruding from a lower inner surface of the second channel 210 toward the center of the flow pipe 10 and formed below the first protrusion 220, and a flow space 240 formed between the first protrusion 220 and the second protrusion 230, and a vertical movement distance of the auxiliary valve part 300 may be limited by the first protrusion 220 and the second protrusion 230, such that the auxiliary valve part 300 is vertically moved in the flow space 240.

The auxiliary valve part 300 may include: a valve stem 310 having a bar shape, and a valve head 320 integrated with the valve stem 310 at a lower end of the valve stem 310 and having a conical shape in which a lower end portion thereof becomes narrow toward the center toward a downward direction, and the valve head may be inserted into the flow space 240 and be vertically moved in the flow space 240.

The valve head 320 may include flow grooves 321 formed in an upper surface thereof, when the upper surface of the valve head 320 contacts a lower surface of the first protrusion 220, the fluid may flow through the flow grooves 321, and when a lower surface of the valve head 320 contacts an upper surface of the second protrusion 230, the second channel 210 may be closed.

The multi-stage poppet valve may further include an additional main valve part having a third channel formed at the center of an inner portion thereof, and having third and fourth protrusions protruding from upper and lower inner surfaces of the third channel toward the center of the flow pipe 10, respectively, the third channel having the fluid flowing therethrough, wherein the main valve part 200 is vertically moved in a flow space formed between the third and fourth protrusions of the additional main valve part.

The number of additional main valve parts included in the multi-stage poppet valve may be one or more.

DETAILED DESCRIPTION OF MAIN ELEMENTS

10: flow pipe
100: fixing part
110: first channel
200: main valve part
210: second channel
220: first protrusion
230: second protrusion
240: flow space
300: auxiliary valve part
310: valve stem
320: valve head
321: flow groove
400: second passage
500: first passage
600: additional main valve part

DETAILED DESCRIPTION OF EMBODIMENTS

Hereinafter, a multi-stage poppet valve according to an exemplary embodiment of the present invention will be described in detail with reference to the accompanying drawings.

The accompanying drawings are only examples illustrated in order to describe the technical idea of the present invention in more detail. Therefore, the technical idea of the present invention is not limited to forms of the accompanying drawings.

Figure 2:
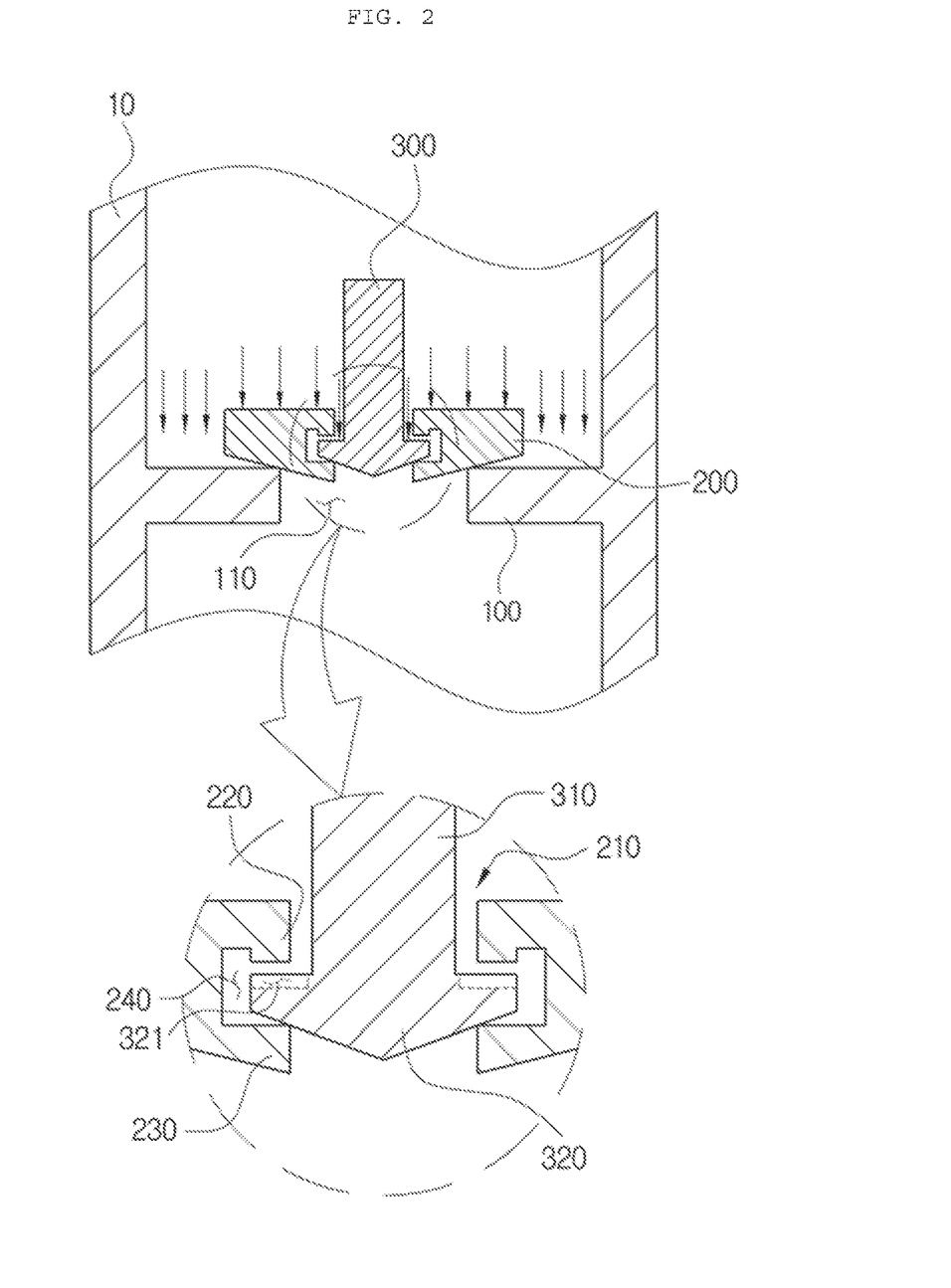
FIG. 2 is a cross-sectional view illustrating a state in which a multi-stage poppet valve according to an exemplary embodiment of the present invention is closed.

FIG. 2 is a cross-sectional view illustrating a state in which a multi-stage poppet valve according to an exemplary embodiment of the present invention is closed.

As illustrated in FIG. 2, the multi-stage poppet valve according to an exemplary embodiment of the present invention is configured to include a flow pipe 10 through which a fluid flows, a fixing part 100, a main valve part 200, and an auxiliary valve part 300.

The flow pipe 10 is a component in which a channel through which the fluid flows is formed, and is a component such as a general hose, pipe, or duct. Since the poppet valve used as an intake valve and an exhaust valve of an internal combustion engine controls a fluid moved at a high pressure in many cases, strength of the flow pipe 10 needs to be high in order to endure the fluid moved at the high pressure. A cross section of the flow pipe 10 may have various shapes. However, in an exemplary embodiment of the present invention, a cross section of the flow pipe 10 has a round shape that is generally used.

The fixing part 100 is extended inwardly from an inner peripheral surface of the channel of the flow pipe 10, and has a first channel 110 formed therein, the first channel 110 being hollowed in a vertical direction and having the fluid flowing therethrough. The main valve part 200 is seated on the fixing part 100 to close the first channel 110. Since the fixing part 110 protrudes from the inner peripheral surface of the channel of the flow pipe 10 toward the center of the flow pipe 10, the fixing part 100 has a cylindrical shape inserted into the flow pipe 10, includes the first channel 110 penetrating from a circle corresponding to a bottom surface of the cylindrical shape up to a circle of a top surface of the cylindrical shape by a predetermined radius from the centers of these circles, and has an approximately ring shape in which a thickness of an outer wall is thick.

As illustrated in FIG. 2, the main valve part 200 is disposed on the fixing part 100, has a second channel 210 formed at the center of an inner portion thereof, and is installed to open and close the first channel 110 by pressure or force acting in the vertical direction, the second channel 210 having the fluid flowing therethrough. In more detail, the main valve part 200 closes the first channel 110 by pressure of the fluid or a force generating means applying force from the top toward the bottom, and is moved upwardly by external force pressing the main valve part 200 from the bottom toward the top to open the first channel 110. As illustrated in FIG. 2, the main valve part 200 is positioned on the fixing part 100 so as to open and close the first channel 110. When the main valve part 200 is not moved by the external force, that is, user's force, the main valve part 200 contacts the fixing part 100 by the pressure of the fluid acting from the top toward the bottom. When the main valve part 200 contacts the fixing part 100 to close the first channel 110, the force generating means such as a spring (not illustrated), or the like, is additionally installed on the main valve part 200, in addition to the fluid applying pressure, thereby making it possible to generate force fixing the main valve part 200.

The main valve part 200 is configured to include a first protrusion 220, a second protrusion 230, and a flow space 240, in addition to the second channel 210.

The first protrusion 220 and the second protrusion 230 protrude toward the center of the flow pipe 10 so as to limit a vertical movement distance of the auxiliary valve part 300 inserted into the second channel 210, and the flow space 240 is a space between the first protrusion 220 and the second protrusion 230. That is, the auxiliary valve part 300 is fitted into the flow space 240 and vertically moves along the flow space 240, which will be described in detail when describing the auxiliary valve part 300.

The auxiliary valve part 300 is inserted into the flow space 240 of the main valve part 200, and is vertically moved in the flow space 240 of the main valve part 200 by pressure or force acting in the vertical direction to open and close the second channel 210. A flow rate of the fluid passing through the second channel 210 is controlled depending on the vertical movement of the auxiliary valve part 300. The auxiliary valve part 300 includes a valve stem 310 and a valve head 320.

The valve stem 310 has a bar shape. The valve head integrated with the valve stem 310 at a lower end of the valve stem 310. The valve head 320 is inserted into the flow space 240, and is vertically moved in the flow space 240. To this end, the valve head 320 may be formed to have a larger diameter than that of the valve stem 310 and smaller than that of the flow space 240. The valve stem 310 and the valve head 320 have a mushroom shape as illustrated in FIG. 2. The valve head 320 corresponding to a head of the mushroom shape is inserted into and is vertically moved in the flow space 240, and the valve stem 310 is connected to the valve head 320. An upper end portion of the valve stem 310 may extend from the flow space 240 to protrude upwardly of the main valve part 200. The auxiliary valve part 300 has the same shape as that of a poppet valve used in the related art, and a separate spring (not illustrated) may be installed on or beneath the valve head 320 to limit movement and a position of the auxiliary valve part 300. The valve head 320 has a conical shape in which a lower end portion thereof becomes narrow toward the center toward a downward direction, and the lower end portion of the valve head 320 contacts the second protrusion 230 to limit a position of the valve head 320. The first channel 110 and the second channel 210 are selectively opened and closed depending on magnitudes of pressure or force acting on the main valve part 200 and the auxiliary valve part 300, which will be described in more detail with reference to the drawings.

Figure 3:
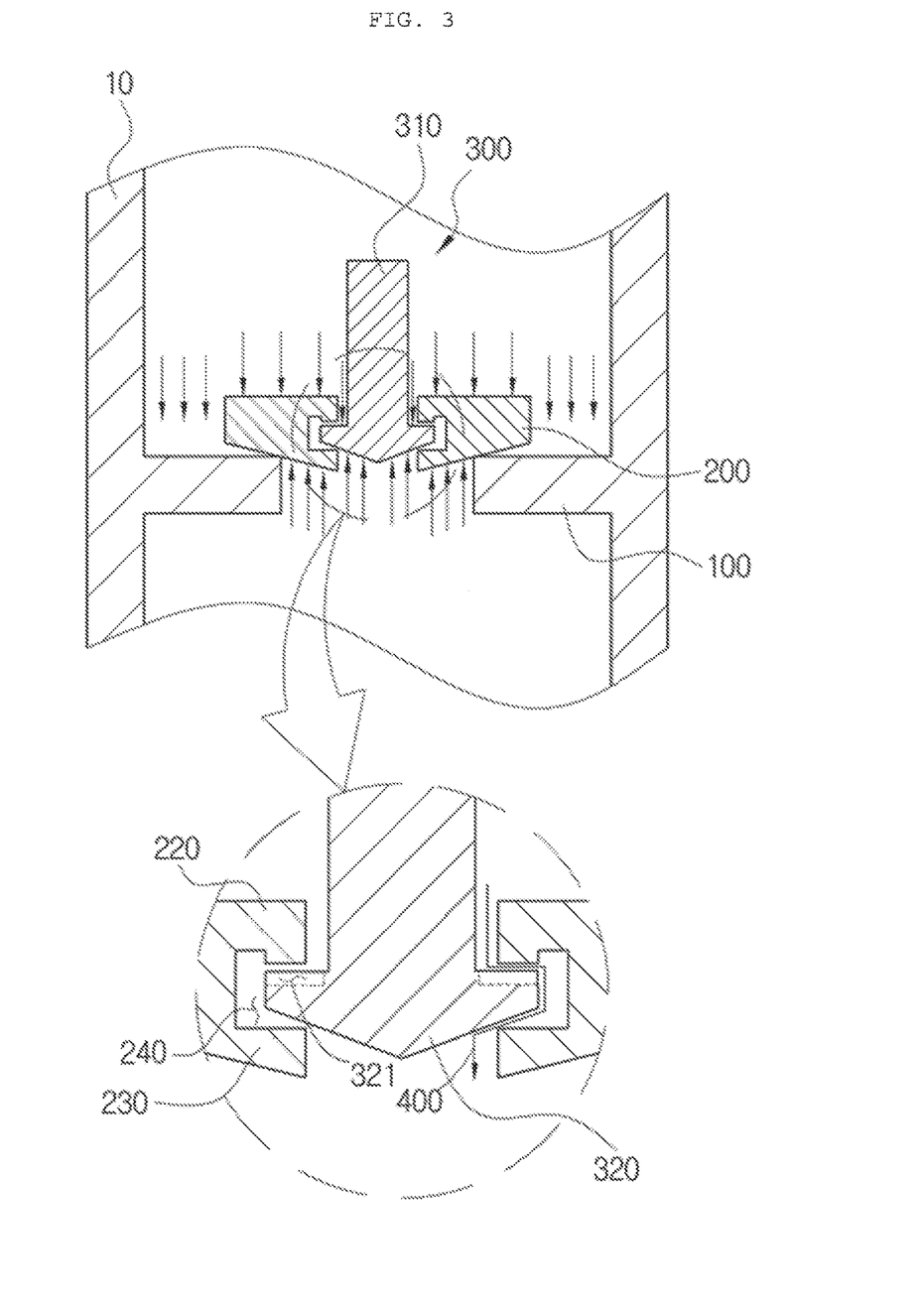
FIG. 3 is a cross-sectional view illustrating a state in which an auxiliary valve part of the multi-stage poppet valve according to an exemplary embodiment of the present invention is opened.

FIG. 3 is a cross-sectional view illustrating a state in which an auxiliary valve part of the multi-stage poppet valve according to an exemplary embodiment of the present invention is opened.

As illustrated in FIG. 3, the auxiliary valve part 300, which is a component first moved when the external force is applied in order to open the first channel 110, may have a weight lighter than that of the main valve part 200.

Figure 4:
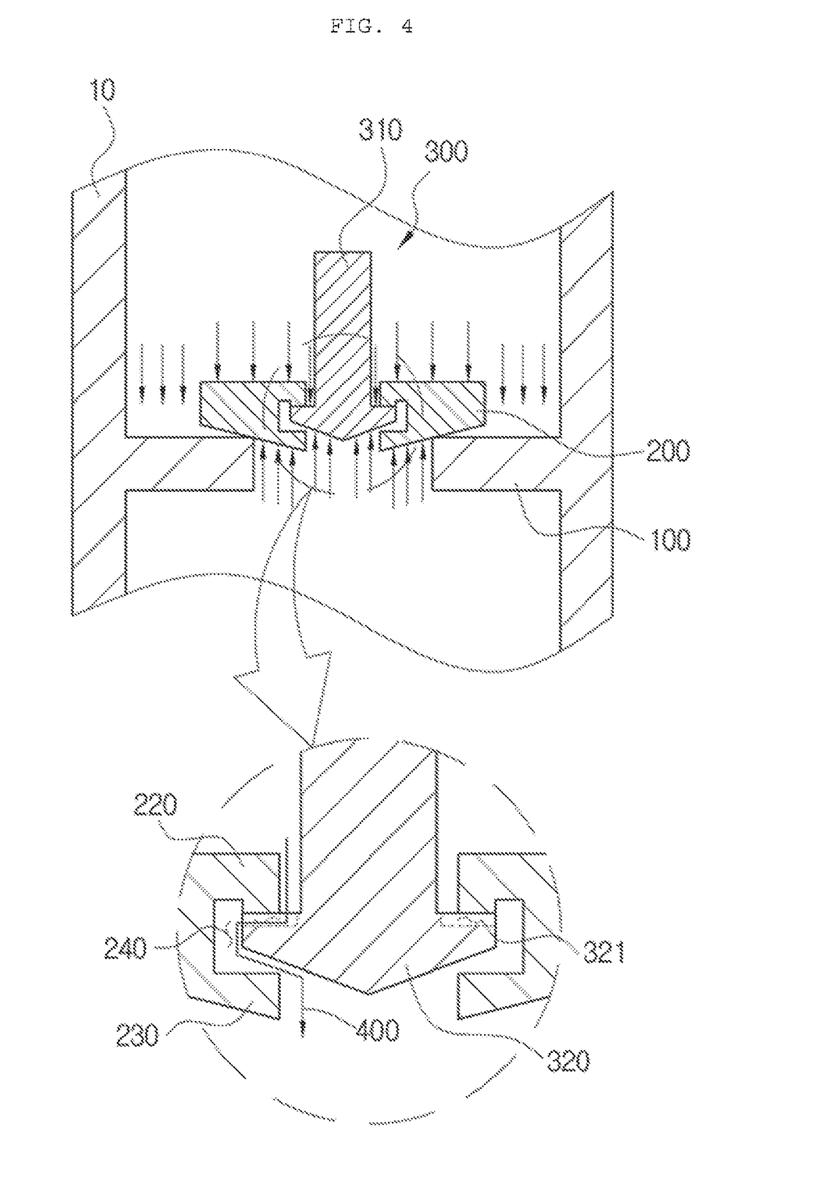
FIG. 4 is a cross-sectional view illustrating a state in which the auxiliary valve part of the multi-stage poppet valve according to an exemplary embodiment of the present invention contacts a first protrusion of a main valve part.
Figure 6:
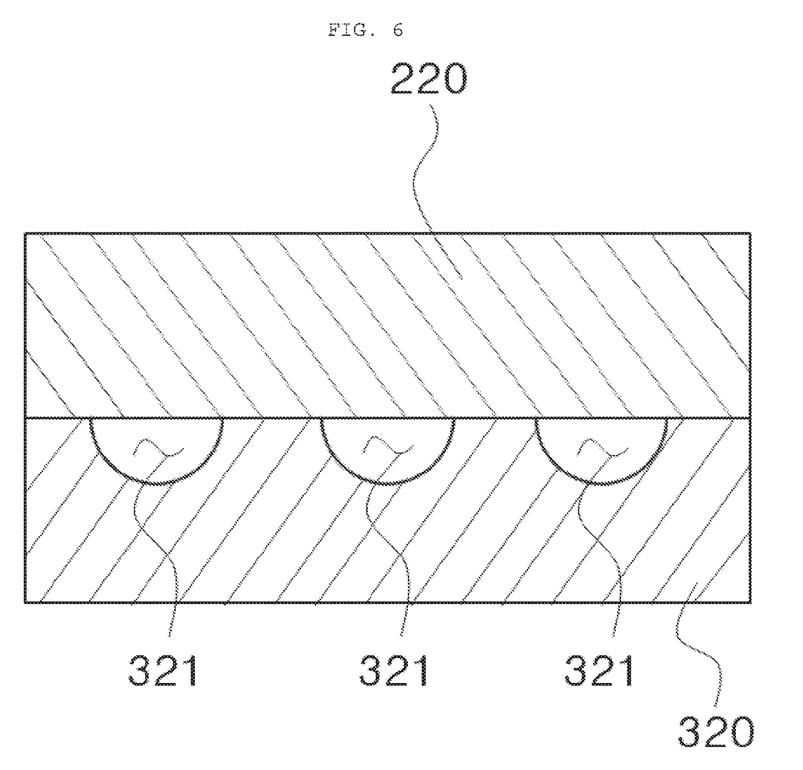
FIG. 6 is a cross-sectional view illustrating a state in which a valve head and a first protrusion according to an exemplary embodiment of the present invention contact each other.

The valve head 320 has flow grooves 321 formed in an upper surface thereof. The flow groove 321 is a component allowing the second channel 210 not to be closed even though the upper surface of the valve head 320 contacts a lower surface of the first protrusion 220. A plurality of flow grooves 321 may be formed in the upper surface of the valve head 320, as illustrated in FIGS. 3, 4, and 6. Separate flow grooves corresponding to the flow grooves 321 are formed in a lower surface of the first protrusion 220 in order to allow a larger amount of fluid to flow depending on a design condition, thereby making it possible to allow the fluid to flow to the flow grooves 321 when the upper surface of the valve head 320 contacts the lower surface of the first protrusion 220. When the external force is applied to the auxiliary valve part 300 from the bottom toward the top, the auxiliary valve part 300 is moved from the bottom of the flow space 240 toward the top thereof.

FIG. 3 illustrates a state in which the valve head 320 does not ascend up to an end of the flow space 240, but ascends up to only the middle of the flow space 240. In this case, the fluid flows from the top toward the bottom through a path formed in the flow space 240. For convenience of explanation, the path through which the fluid passes, formed in the second channel 210 when the auxiliary valve part 300 ascends, is defined as a second passage 400. An arrow 400 illustrated in FIG. 3 illustrates the second passage 400 corresponding to a path through which the fluid flows in the flow space 240. Even the valve head 320 ascends up to the end of the flow space 240, such that the upper surface of the valve head 320 contacts the lower surface of the first protrusion 220, the second passage 400 is not closed due to the flow grooves 321 formed in the upper surface of the valve head 320. The flow grooves 321 will be described below.

Figure 5:
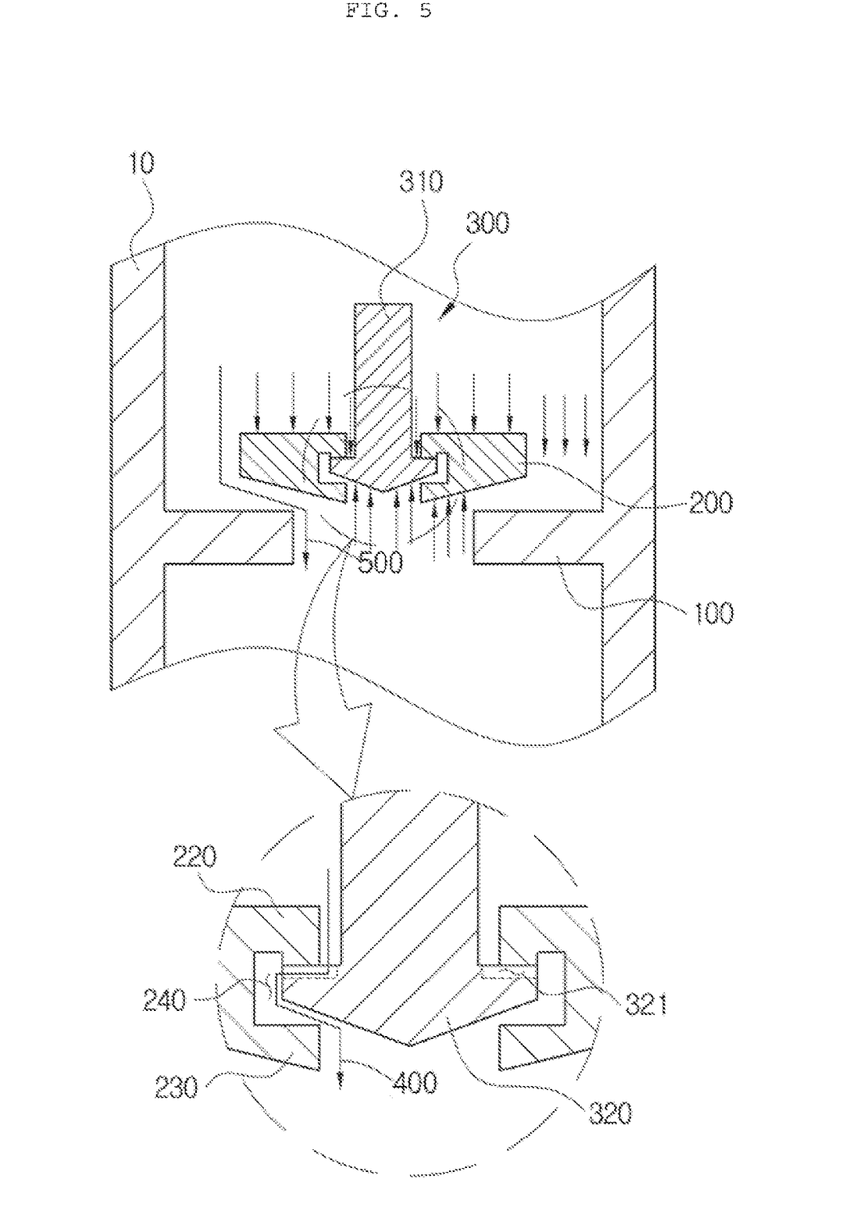
FIG. 5 is a cross-sectional view illustrating a state in which the main valve part and the auxiliary valve part of the multi-stage poppet valve according to an exemplary embodiment of the present invention are completely opened.

FIG. 4 is a cross-sectional view illustrating a state in which the auxiliary valve part 300 of the multi-stage poppet valve according to an exemplary embodiment of the present invention contacts a first protrusion of a main valve part 200, FIG. 5 is a cross-sectional view illustrating a state in which the main valve part and the auxiliary valve part of the multi-stage poppet valve according to an exemplary embodiment of the present invention are completely opened, and FIG. 6 is a cross-sectional view illustrating a state in which a valve head 320 and a first protrusion 220 according to an exemplary embodiment of the present invention contact each other.

As illustrated, in FIG. 4, even though the upper surface of the valve head 320 contacts the lower surface of the first protrusion 220, an upper side and a lower side of the second channel 210 based on the valve head 320 are connected to each other due to the flow grooves 321 formed in the upper surface of the valve head 320, such that the fluid passes through the second channel 210. FIG. 6, which illustrates that the valve head 320 and the first protrusion 220 contact each other, illustrates a state in which the cross-sectional view of FIG. 4 rotates leftward by 90 degrees. As illustrated in FIG. 4, even though the first protrusion 220 contacts the valve head 320, the fluid may pass through the flow grooves 321. The fluid illustrated in FIG. 4 is introduced into the flow grooves 321, flows to the flow space 240, and then exits between the valve head 320 and the second protrusion 230. That is, the fluid exits through the flow grooves 321 illustrated in FIG. 6.

When a user applies more force to the auxiliary valve part 300 from the bottom toward the top in a state in which the upper surface of the valve head 320 contacts the lower surface of the first protrusion 220 as illustrated in FIG. 4, the valve head 320 is in a state in which it is caught by the first protrusion 220, such that the auxiliary valve part 300 and the main valve part 200 are moved upwardly together with each other, as illustrated in FIG. 5. As the main valve part 200 ascends, a larger amount of fluid flows from the top toward the bottom through a path newly formed between the main valve part 200 and the fixing part 100. An arrow 500 illustrated in FIG. 5 illustrates this path, and the path through which the fluid passes, formed in the first channel 110 when the main valve part 200 and the auxiliary valve part 300 ascend together with each other is defined a first passage 500. Since the first passage 500 is formed after the second passage 400 is formed, the second passage 400 is formed or the second passage 400 and the first passage 500 are formed together, in the multi-stage poppet valve according to an exemplary embodiment of the present invention.

In summary, when external force of a predetermined reference opening force or less is applied to the auxiliary valve part 300 in order to open the channel of the flow pipe 10, the auxiliary valve part 300 lighter than the main valve part 200 first ascends upwardly, such that the second passage 400 corresponding to a narrow passage through which the fluid flows, is formed. When external force of the predetermined reference opening force or more is applied to the auxiliary valve part 300, the main valve part 200 and the auxiliary valve part 300 ascend together, such that the first passage 500 corresponding to a wide passage through which the fluid flows, is additionally formed.

In more detail, the multi-stage poppet valve according to an exemplary embodiment of the present invention may be in four states. A first state is a state in which the channel of the flow pipe 10 is closed, as illustrated in FIG. 2. That is, the fixing part 100 and the main valve part 200 contact each other to close the first channel 110, and the second protrusion 230 and the valve head 320 contact each other to close the second channel 210 formed at the center of the inner portion of the main valve part 200.

A second state is a state in which the fluid passes from the top toward the bottom in the second channel 210, as illustrated in FIG. 3. The external force is applied upwardly to the auxiliary valve part 300 so that only the auxiliary valve part 300 is moved upwardly. Force of the fluid pressing the auxiliary valve part 300 downwardly is represented by arrows acting on the upper surface of the valve head 320 illustrated in FIG. 3. A small number of arrows indicate that the force of the fluid pressing the auxiliary valve part 300 from the top toward the bottom is relatively small. Therefore, since the auxiliary valve part 300 may be moved with smaller force as compared with the related art, the multi-stage poppet valve may be moved more easily as compared with the related art. In addition, since the applied force itself is smaller as compared with the related art, durability of the auxiliary valve part 300 is improved.

A third state is a state in which the external force is applied to the auxiliary valve part 300 to move the auxiliary valve part 300 upward and the valve head part 320 contacts the lower surface of the first protrusion 220, as illustrated in FIG. 4. In this case, the fluid flows from the top toward the bottom through the flow grooves 321 formed in the upper surface of the valve head 320. A flow rate of the fluid flowing from the top toward the bottom in the third state is smaller than that in the second state.

A fourth state is a state in which the external force is additionally applied to the auxiliary valve part 300 in the third state, such that the main valve part 200 and the auxiliary valve part 300 are moved upwardly together, as illustrated in FIG. 5. In this state, the main valve part 200 is spaced apart from the fixing part 100, such that the first passage 500 is formed between the main valve part 200 and the fixing part 100. As described above, the first passage 500 is formed together with the second passage 400, such that the largest amount of fluid flows in this state.

Since a flow rate of the fluid is changed depending on each state, the flow rate may be controlled by controlling a position of the main valve part 200 or the auxiliary valve part 300 depending on selection or need of the user.

Figure 7:
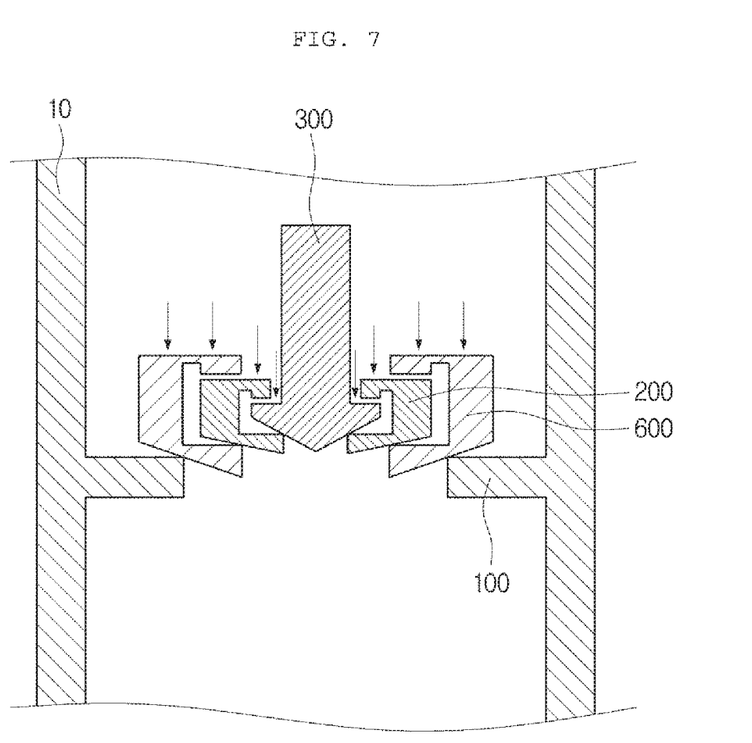
FIG. 7 is a schematic view illustrating a three-stage poppet valve according to an exemplary embodiment of the present invention.

In addition, the multi-stage poppet valve according to an exemplary embodiment of the present invention may be configured to further include a separate additional main valve part 600 formed to surround an outer peripheral surface of the main valve part 200. As illustrated in FIG. 7, the additional main valve part has a third channel formed at the center of an inner portion thereof, and has third and fourth protrusions protruding from upper and lower inner surfaces of the third channel toward the center of the flow pipe 10, respectively, the third channel having a fluid flowing therethrough. The main valve part 200 may be vertically moved in a flow space formed between the third and fourth protrusions of the additional main valve part.

The additional main valve part has the same structure as that of the main valve part 200, and is formed in a structure in which it surrounds the main valve part 200, and the number of installed additional main valve parts may be one or more. The multi-stage poppet valve according to an exemplary embodiment of the present invention may be a two-stage poppet valve as illustrated in FIG. 2, be a three-stage poppet valve including the auxiliary valve part, the main valve part, and the additional main valve part as illustrated in FIG. 7, or be a multi-stage poppet valve further including a plurality of additional main valve parts added as needed. This may be changed depending a kind, pressure, or speed of the fluid, or other environments.

According to an exemplary embodiment of the present invention, the poppet valve is formed in a multi-stage form to disperse a magnitude of force transferred to the respective components by the user or the fluid applying pressure, thereby improving durability.

In addition, according to an exemplary embodiment of the present invention, the valve may be opened and closed with small force.

In addition, according to an exemplary embodiment of the present invention, a flow rate of the fluid may be stepwise controlled.

The present invention is not limited to the above-mentioned exemplary embodiments, but may be variously applied. In addition, the present invention may be variously modified by those skilled in the art to which the present invention pertains without departing from the gist of the present invention claimed in the claims.

What is claimed is:

1. A multi-stage poppet valve comprising:
    a flow pipe in which a channel through which a fluid flows is formed;
    a fixing part extended inwardly from an inner peripheral surface of the channel of the flow pipe, and having a first channel formed therein, the first channel being hollowed in a vertical direction and having the fluid flowing therethrough;
    a main valve part disposed on the fixing part, having a second channel formed at a center of an inner portion thereof, and vertically moved by force acting in the vertical direction to open and close the first channel, the second channel having the fluid flowing therethrough; and
    an auxiliary valve part vertically moved in the second channel by force acting in the vertical direction to open and close the second channel, thereby controlling a flow rate of the fluid passing through the second channel,
    wherein the first channel and the second channel are selectively opened and closed depending on magnitudes of force acting on the main valve part and the auxiliary valve part,
    wherein the main valve part includes a first protrusion protruding from an upper inner surface of the second channel toward a center of the flow pipe, a second protrusion protruding from a lower inner surface of the second channel toward the center of the flow pipe and formed below the first protrusion, and a flow space formed between the first protrusion and the second protrusion, and
    the auxiliary valve part is vertically moved in the flow space and a vertical movement distance of the auxiliary valve part is limited by the first protrusion and the second protrusion.

2. The multi-stage poppet valve of claim 1, wherein the auxiliary valve part includes:
    a valve stem having a bar shape; and
    a valve head integrated with the valve stem at a lower end of the valve stem and having a conical shape in which a lower end portion thereof becomes narrow toward the center toward a downward direction, and
    the valve head is inserted into the flow space and is vertically movable in the flow space.

3. The multi-stage poppet valve of claim 2, wherein the valve head includes flow grooves formed in an upper surface thereof, when the upper surface of the valve head contacts a lower surface of the first protrusion, the fluid flows through the flow grooves, and when a lower surface of the valve head contacts an upper surface of the second protrusion, the second channel is closed.

4. The multi-stage poppet valve of claim 1, further comprising an additional main valve part having a third channel formed at the center of an inner portion thereof, and having third and fourth protrusions protruding from upper and lower inner surfaces of the third channel toward the center of the flow pipe, respectively, the third channel having the fluid flowable therethrough, wherein the main valve part is vertically movable in a flow space formed between the third and fourth protrusions of the additional main valve part.

5. The multi-stage poppet valve of claim 4, wherein the number of additional main valve parts included in a multi-stage poppet valve is one or more.

* * * * *